Figure 1:
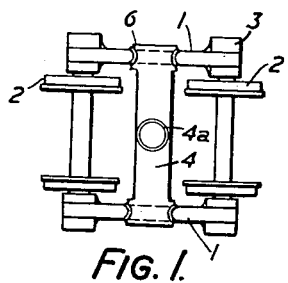

April 25, 1961     F. W. SINCLAIR     2,981,208

BOGIE TRUCKS FOR RAIL VEHICLES

Filed May 1, 1959     2 Sheets-Sheet 1

INVENTOR

FREDERICK WILLIAM SINCLAIR

BY

Irwin S. Thompson

ATTORNEY

April 25, 1961
F. W. SINCLAIR
2,981,208
BOGIE TRUCKS FOR RAIL VEHICLES
Filed May 1, 1959
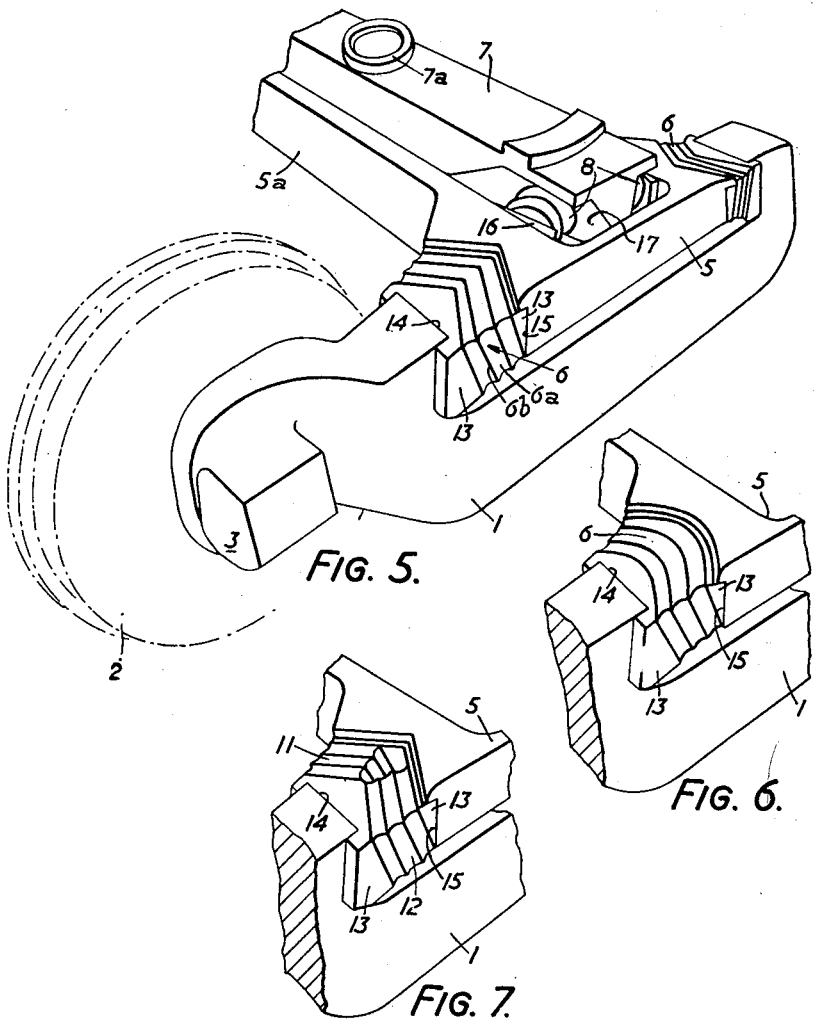
INVENTOR
FREDERICK WILLIAM SINCLAIR
BY
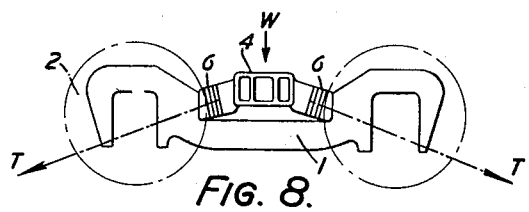
ATTORNEY

United States Patent Office 2,981,208
Patented Apr. 25, 1961

2,981,208

BOGIE TRUCKS FOR RAIL VEHICLES

Frederick William Sinclair, Gloucester, England, assignor to Gloucester Railway Carriage and Wagon Company Limited, Gloucester, England Filed May 1, 1959, Ser. No. 810,348

7 Claims. (Cl. 105—197)

This invention relates to bogie trucks for rail vehicles and is more particularly concerned with the suspension arrangements of such bogie trucks.

Bogie trucks are of two main types. The first or carriage-type bogie, i.e. the type of bogie normally used for passenger-carrying vehicles, generally has fixed transverse members to join the side frames of the bogie together, these fixed transverse members supporting a floating bolster hung from links attached to the transverse members in order to permit lateral side movement of the superstructure, i.e. the coach body. The second or wagon-type bogie commonly has a single transverse member connecting the side frames together, such transverse member being the bolster itself which does not generally float on links and is either completely rigid with the side frames or, as in the "spring plankless" type of bogie, is slidably mounted on spring groups in the side frames.

Bogie trucks have been proposed in which flat panels of rubber have been arranged on each side of the side frames between the side frames and a transverse member, with the panels disposed at an angle to the direction of the normal load so that vertical components of the load are taken mainly in shear whilst lateral components are taken mainly in compression. With such arrangements relative longitudinal movement between the side frames and the transverse member is taken in shear.

As a result of such rubber mounting the metal to metal sliding contacts between the bolster and side frames of the "spring plankless" bogie truck are avoided, thus obviating all wear and the necessity for lubrication, while a very considerable disadvantage of the carriage type bogie truck is also overcome. This disadvantage, which arises from the rigidity of the bogie frame structure produced by the attachment of the fixed transverse members to the side frames, is the transmission of forces by the former through the latter with the tendency to fatigue and fracture of the side frames especially when the latter are of the welded type.

However, in all arrangements which have been proposed for the resilient mounting of the transverse members on the side frames, vertical loading of the latter in the plane of the side frames remains unaltered, as compared with more conventional forms of bogie truck, for a given loaded weight of the truck. As a result, although the resilient mounting has reduced wear and the liability to fracture of the side frames, the side frames themselves must be of substantially the same weight and strength as before.

According to the present invention the transverse member or members by which the side frames of a bogie truck for rail vehicles are connected together is or are secured to, and resiliently suspended from, the side frames by means of blocks of rubber or similar resilient material interposed between adjacent parts of the transverse member or members and the side frames, the arrangement being such that in use the resilient blocks sustain not only the body load but also the traction forces, braking forces and lateral thrusts due to side sway of the body in motion as combined shear and compression loads.

The lateral surfaces of the resilient blocks and the adjacent parts of the transverse member or members and the side frames may be inclined to the vertical and, viewed in plan, may have a component in the longitudinal direction. Alternatively, the resilient blocks may be fixed to mounting members or adaptors the adjacent abutment surfaces of which are appropriately inclined to the vertical and have a component in the longitudinal direction whilst their outer surfaces are formed for fitting to suitable mounting surfaces, which may for example be vertical, formed on the transverse members and the side frames.

The improved bogie truck of the present invention may be constructed so that it is capable of being easily assembled or dismantled without taking the complete truck from underneath the superstructure in the event of it being necessary to change a side frame, an operation which can only be achieved with much difficulty in carriage-type, or wagon, bogies of the usual constructions.

As a result of the inclination of the resilient blocks to the vertical, so that the body load is sustained partly in shear and partly in compression, the body load produces a bending moment in the side frames which can be arranged to counterbalance almost completely the bending moment due to the vertical loading of the axle boxes. As a result, the section of each side frame between two inclined resilient blocks mounting the transverse member or members on that frame becomes more a tension tie than a beam in bending. It follows, therefore, that the cross-section of the frame can be made much shallower than it would otherwise be if the load were carried, for instance, on coil springs at the ends of the transverse member or members which would produce a much greater bending moment in the frame. As an example, the rubber blocks may be inclined at an angle of approximately 14° to the vertical.

Preferably the blocks are of chevron or substantially crescent shape in plan, or at each mounting point two blocks may be used which are oppositely inclined relatively to the longitudinal axis of the bogie truck. The two blocks may be formed as a compound unit in which they are bonded to common end plates.

If desired, and more especially with bogie trucks intended for passenger-carrying vehicles, the resiliently mounted transverse member or members may have a separate bolster hung therefrom. Such bolster may be merely hung on links from the transverse member or members in order to permit additional side sway of the body or it may be sprung with respect to the resiliently mounted transverse member or members. In such case the springing may be achieved by means of the interposition of blocks of rubber or other resilient material between the bolster and the resiliently mounted transverse member or members, as has already been described in respect of the latter. In either case a plurality of transverse members may be employed, such members being preferably constructed, however, as a single fabrication resiliently suspended from the side frames as a unit and having a space between the forward and rearward transverse members for accommodating the separate bolster.

Alternatively, and more especially with bogies intended for wagons, a single resiliently mounted transverse member may be employed, such member comprising the bolster itself.

The resilient blocks are preferably of laminated construction, comprising layers of rubber or like material bonded to alternating metal plates the outer two of which form end plates for mounting purposes. In the interests of standardisation, blocks can be made of the same size but with different grades of rubber or other resilient material, the block used in a particular bogie truck depending on the maximum normal loading of the truck. Thus, trucks for different loads will have a standard deflection from the free to the fully laden condition.

Vertical positioning of the rubber blocks supporting the transverse members on the side frames is desirably such that undue rolling of the transverse members is not produced. Some rolling will tend to result if the blocks are positioned above or below the axle centres, but a difference in height relatively to the latter which is small in comparison with the dimensions of the blocks is generally acceptable. Rolling results from transverse loading and is substantially independent of vertical or longitudinal loads. Where possible, however, it is desirable to make the side frames shallow enough to reduce the difference in height between the blocks and the axle centres as far as reasonably possible.

If desired damping means, for example telescopic dampers, can be fitted between the transverse members and the side frames to damp the relative vertical movement between these parts which is allowed by the resilient blocks.

Figure 2:
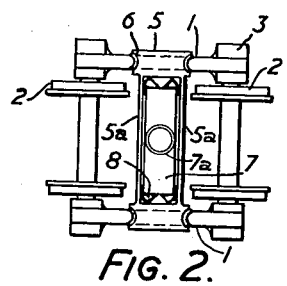
Figure 3:
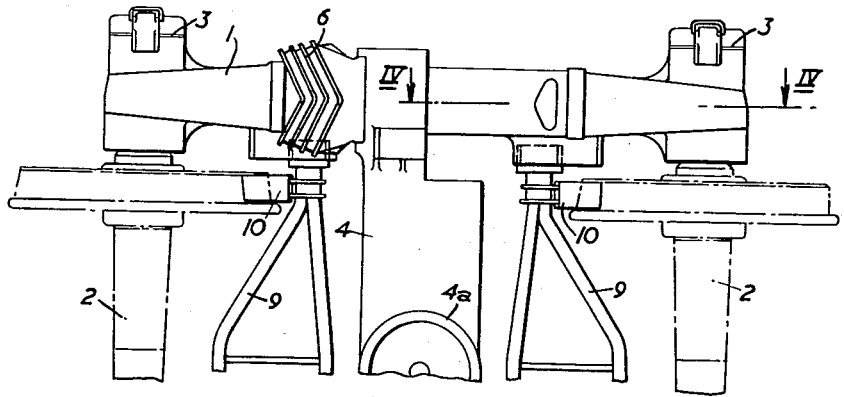
Figure 4:
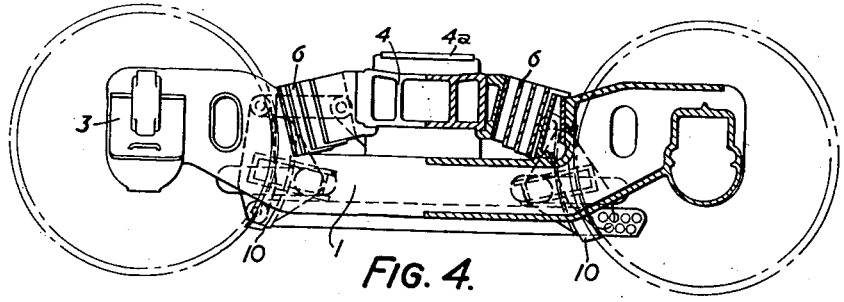

The invention will now be further described with reference to the accompanying drawings which illustrate, by way of example, several embodiments of the invention, and in which:

Figure 1 is a diagrammatic plan view of a "spring plankless" wagon bogie truck according to the invention, Figure 2 is a similar view of a carriage bogie truck according to the invention, Figure 3 is a half plan view, partly cut away, of a further construction of "spring plankless" wagon bogie truck according to the invention, Figure 4 is a side elevational view of the bogie truck of Figure 3 in half section along the line IV—IV, Figure 5 is a diagrammatic and fragmentary perspective view, to a larger scale, of a further construction of carriage bogie truck, Figure 6 is a fragmentary perspective view illustrating a modification of the bogie truck of Figure 5, Figure 7 is a view similar to Figure 6 illustrating a further modification, and Figure 8 is a diagrammatic view showing the forces acting on a side frame of the described embodiments as a result of vertical truck loading.

In all the figures like parts are indicated by common reference numerals.

Referring to Figures 1 and 2, each of the bogie trucks illustrated therein has side frames 1 in which the axles of two wheel and axle sets 2 are rotatably mounted in axle boxes such as 3 of conventional form. In the wagon bogie of Figure 1 a single transverse member 4 formed with a truck pivot mounting 4a connects together the side frames 1, whereas in the carriage bogie of Figure 2 two transverse members 5a formed as a single fabricated unit 5 similarly connect together the side frames 1. In both these arrangements the transverse members are secured to, and resiliently suspended from, the side frames 1 by means of blocks such as 6 of rubber or similar resilient material, four of these blocks being interposed between adjacent parts of the transverse members and the side frames 1. The blocks are of laminated crescent shaped form and are disposed adjacent the four corners of the transverse member 4 or fabricated unit 5; the arrangement of the blocks 6 is shown in Figure 7 and is described in greater detail later with reference to that figure.

The carriage bogie truck of Figure 2 has a space between the two transverse members 5a in which is accommodated a separate floating bolster which is formed with a carriage mounting 7a and permits lateral side movement of a coach body mounted on the bolster. Four further resilient blocks 8, which are conveniently of laminated cylindrical form as shown in the arrangement of Figure 5 and described in greater detail later with reference to that figure, are disposed adjacent the four corners of the bolster 7 and provide a resilient mounting of the bolster on the transverse members 5.

In the bogie truck of Figures 3 and 4, the resilient blocks 6 which connect the transverse member 4 to the side frames 1 are of chevron shape in plan view and disposed in a manner similar to that illustrated in Figure 5 and described later with reference to that figure. Braking means of conventional form are fitted and include brake beams 9 and brake shoes 10 which operate on both wheel and axle sets 2.

The carriage bogie truck of Figure 5 also has two transverse members 5a forming a fabricated unit 5 connecting the side frames 1 and between which is accommodated the floating bolster 7. As in the arrangement of Figure 2 the transverse members are connected to the side frames 1 through four resilient blocks 6 and the bolster 7 is mounted on the transverse members through four resilient blocks 8. In this case the blocks 6, as in the arrangement of Figures 3 and 4, are of chevron shape, although as shown in the modification of Figure 6 they may be of crescent shape as in the arrangement of Figure 2. Figure 7 illustrates a further modification in which the blocks 6 are replaced by two blocks 11 and 12 which are bonded to common end plates to form compound units. The blocks 11 and 12 are mutually inclined and also oppositely inclined relatively to the longitudinal axis of the bogie truck.

In all the illustrated embodiments the resilient blocks are of laminated construction comprising, as shown more particularly in Figure 5 in connection with one of the blocks 6, layers of rubber or like material such as 6a sandwiched between and bonded to alternating metal plates such as 6b the two outer of which form end plates for mounting purposes. As already mentioned, each pair of blocks 11 and 12 share common end plates to form a combined unit. The blocks illustrated all have three layers of rubber sandwiched between four alternating steel plates, and such a construction has been found in practice to give excellent results.

Each block 6, or combined unit 11 and 12, is fixed between suitably contoured mounting members or adaptors 13 which are mounted on vertical mounting faces 14 and 15 formed respectively on one of the side frames 1 and transverse members 4 or 5a. Each resilient block 8 is fixed at its lower end to a mounting member or adaptor 16 mounted on a vertical face formed on one transverse member 5a and at its other end is fixed on a lateral face 17 of the bolster 7. The abutment surfaces of the adaptor 13 and 16 and the lateral face 17 are inclined to the vertical and, when viewed in plan, have a component in the longitudinal direction of the truck. This arrangement provides a downward inclination of the resilient blocks so that they sustain not only body loads but also traction forces, braking forces and lateral thrust due to side sway of the body in motion as combined shear and compression loads.

As shown diagrammatically in Figure 8, the downward inclination of the blocks 6 results in a vertical body load in the direction of the arrow W on the transverse member 4 being transmitted to each side frame 1 as resultant thrusts in the direction of the arrows T. As referred to earlier, these thrusts produce a bending moment in the side frame 1 which can be arranged to counterbalance almost completely the bending moment due to the vertical loading of the axle boxes. This enables the cross-section of the side frame 1 between the two corresponding blocks 6 to be considerably less than is normally the case, resulting in side frames of considerably lighter and cheaper form.

The resilient blocks may be arranged with their longitudinal axes directed inwardly from the side frames as well as upwardly, so that they have a greater tendency to maintain the transverse member 4 or transverse members 5a and the wheel and axle sets 2 square with the side frames 1.

It will be appreciated that in all cases the two side frames 1 of the bogie truck, which are the main members of the truck structure, are retained relatively to each other by the resiliently suspended members 4 or 5a.

I claim:

1. A bogie truck for a rail vehicle comprising a pair of rigid side frames, front and rear axles extending between the side frames and being interconnected solely by said side frames, each side frame having a generally U-shaped notch in its upper edge between the axles, each notch providing front and rear abutments, a transverse member extending between the side frames and having end portions at least partly received in the notches, front and rear abutments on said end portions opposed respectively to the front and rear abutments provided by the notches so that each two opposed abutments form a spaced pair of abutments, and blocks of resilient material interposed between and secured to the abutments of each pair, said transverse member providing the sole connection between the side frames except for the axles so that the side frames are resiliently connected together.

2. A bogie truck for a rail vehicle comprising a pair of rigid side frames, front and rear axles extending between the side frames and being interconnected solely by said side frames, each side frame having a generally U-shaped notch in its upper edge between the axles, each notch providing front and rear abutments, a transverse member extending between the side frames and having end portions at least partly received in the notches, front and rear abutments on said end portions opposed respectively to the front and rear abutments provided by the notches so that each two opposed abutments form a spaced pair of abutments, and blocks of resilient material each comprising alternate chevron-shaped laminations of a rigid material and of a resilient material interposed between and secured to the abutments of each pair so that the chevron shapes of the laminations are directed from one to the other of the abutments of each pair, said transverse member providing the sole connection between the side frames except for the axles so that the side frames are resiliently connected together.

3. A bogie truck for a rail vehicle comprising a pair of rigid side frames, front and rear axles extending between the side frames and being interconnected solely by said side frames, each side frame having a generally U-shaped notch in its upper edge between the axles, each notch providing front and rear abutments, a transverse member extending between the side frames and having end portions partly received in the notches and partly extending above the upper edge of the side frame, front and rear abutments on said end portions opposed respectively to the front and rear abutments provided by the notches, each two opposed abutments being spaced apart in directions having both vertical and horizontal components and forming a pair, and blocks of resilient material each comprising alternate chevron-shaped laminations of a rigid material and of a resilient material interposed between and secured to the abutments of each pair so that the chevron shapes of the laminations are directed from one to the other of the abutments of each pair and so that the blocks are inclined downwardly from the abutments on the transverse member to the abutments on the side frames, said transverse member providing the sole connection between the side frames except for the axles so that the side frames are resiliently connected together.

4. A bogie truck according to the claim 3, wherein the abutments on the side frames and on the end portions of the transverse member are provided by mounting members secured to vertical mounting faces on the side frames and transverse member, said mounting members having inclined faces to which the resilient blocks are secured.

5. A bogie truck for a rail vehicle comprising a pair of rigid side frames, front and rear axles extending between the side frames and being interconnected solely by the side frames, each side frame having a generally U-shaped notch in its upper edge between the axles, each notch providing front and rear abutments, a transverse member extending between the side frames and having end portions at least partly received in the notches, said transverse member comprising two spaced transverse elements connected by said end portions, front and rear abutments on said end portions opposed respectively to the front and rear abutments provided by the notches so that each two opposed abutments form a spaced pair of abutments, blocks of resilient material each comprising alternate chevron-shaped laminations of a rigid material and of a resilient material interposed between and secured to the abutments of each pair so that the chevron shapes of the laminations are directed from one to the other of the abutments, a bolster located between the spaced elements of the transverse member, and the further resilient blocks interposed between the bolster and the transverse member to resiliently mount the former on the latter, said transverse member providing the sole connection between the side frames except for the axles so that said frames are resiliently connected together.

6. A bogie truck for a rail vehicle comprising a pair of rigid side frames, front and rear axles extending between the side frames and being interconnected solely by said side frames, each side frame having a generally U-shaped notch in its upper edge between the axles, each notch providing front and rear abutments, a transverse member extending between the side frames and having end portions at least partly received in the notches, front and rear abutments on said end portions opposed respectively to the front and rear abutments provided by the notches so that each two opposed abutments form a spaced pair of abutments, blocks of resilient material each comprising alternate crescent-shaped laminations of a rigid material and of a resilient material interposed between and secured to the abutments of each pair so that the apices of the crescent shapes are directed from one to the other of the abutments of each pair, said transverse member providing the sole connection between the side frames except for the axles so that said frames are resiliently connected together.

7. A bogie truck for a rail vehicle comprising a pair of rigid side frames, front and rear axles extending between the side frames and being interconnected solely by said side frames, each side frame having a generally U-shaped notch in its upper edge between the axles, each notch providing front and rear abutments, a transverse member extending between the side frames and having end portions at least partly received in the notches, front and rear abutments on said end portions opposed respectively to the front and rear abutments provided by the notches so that each two opposed abutments form a spaced pair of abutments, and blocks of resilient material interposed between and secured to the abutments of each pair, each block comprising two diverging limbs each formed of alternate laminations of a rigid material and of a resilient material, the ends of the limbs being secured to the opposed abutments of each pair, said transverse member providing the sole connection between the side frames except for the axles so that said side frames are resiliently connected together.

References Cited in the file of this patent

UNITED STATES PATENTS

| | | |
|---|---|---|
| 2,674,449 | Tucker | Apr. 6, 1954 |
| 2,747,519 | Heater et al. | May 29, 1956 |
| 2,777,401 | Rossell | Jan. 15, 1957 |
| 2,841,096 | Hirst | July 1, 1958 |
| 2,861,522 | Rossell | Nov. 25, 1958 |

FOREIGN PATENTS

| | | |
|---|---|---|
| W13,448 | Germany | Mar. 1, 1956 |